Oct. 6, 1970

L. W. MARKS 3,532,964

LOAD COMPENSATED INSTRUMENT POTENTIAL
TRANSFORMER OF IMPROVED ACCURACY

Filed Feb. 7, 1968

INVENTOR:
LOUIS W. MARKS,
BY J. Wesley Haubner
ATTORNEY

Oct. 6, 1970
L. W. MARKS
3,532,964
LOAD COMPENSATED INSTRUMENT POTENTIAL
TRANSFORMER OF IMPROVED ACCURACY
Filed Feb. 7, 1968
2 Sheets-Sheet 2
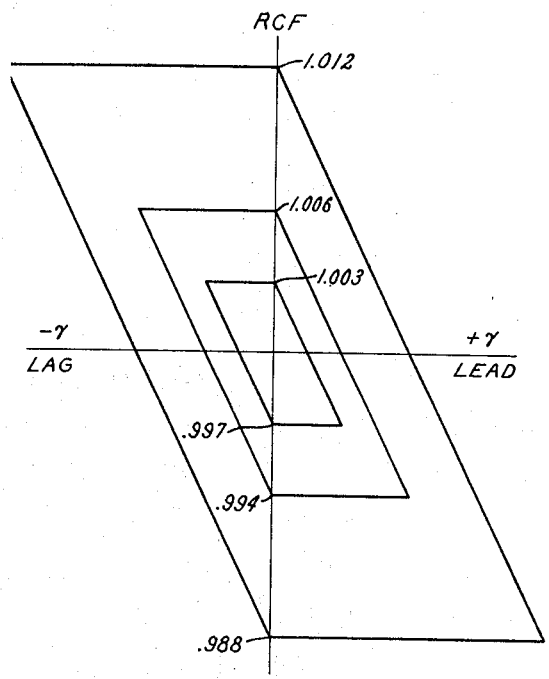
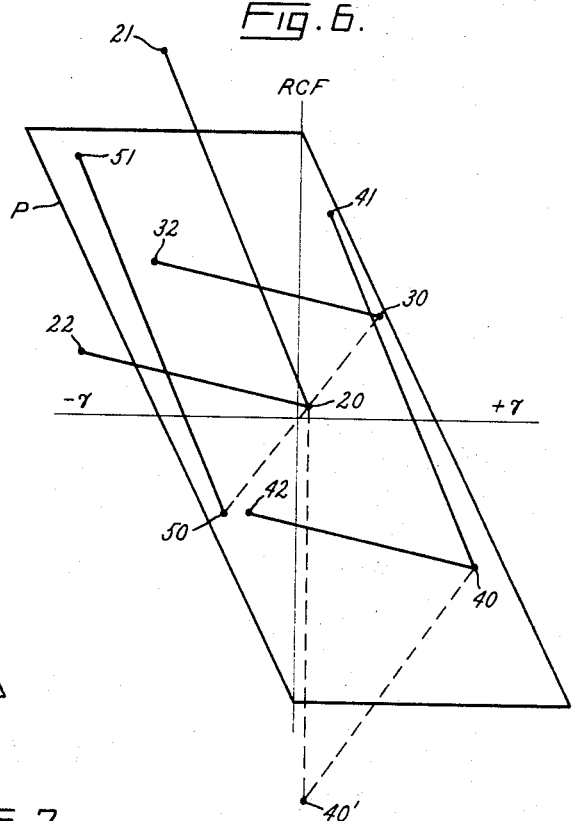
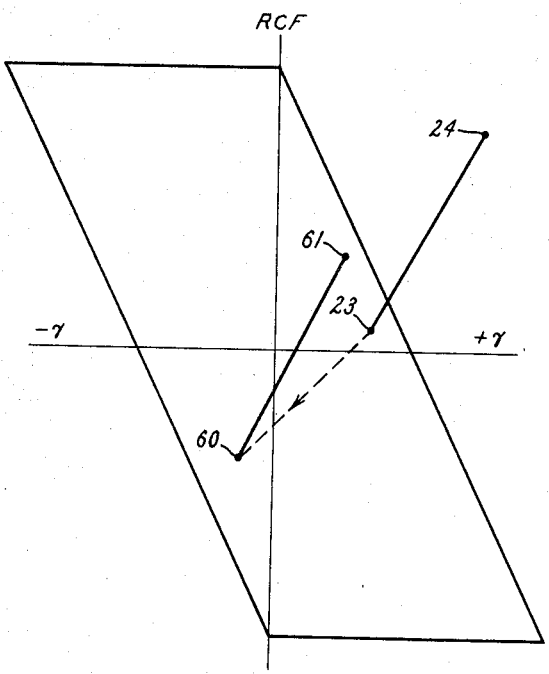
INVENTOR:
LOUIS W. MARKS,
BY *J Wesley Haubner*
ATTORNEY

# United States Patent Office 3,532,964
Patented Oct. 6, 1970

3,532,964
LOAD COMPENSATED INSTRUMENT POTENTIAL TRANSFORMER OF IMPROVED ACCURACY
Louis W. Marks, Pittsfield, Mass., assignor to General Electric Company, a corporation of New York
Filed Feb. 7, 1968, Ser. No. 703,625
Int. Cl. G01r 35/04; G01f 3/00
U.S. Cl. 323—60                                  5 Claims

ABSTRACT OF THE DISCLOSURE

In instrument potential transformers designed for a high degree of accuracy, it is especially difficult to maintain secondary voltage error within the predetermined limits with an inductive load of high volt-ampere rating (i.e., high inductive burden) or when the power factor of the burden is near unity. By providing across the secondary winding terminals a fixedly connected reactive burden, phase angle error is compensated. The reactive fixed burden may be capacitive or inductive, as required, and its effect on magnitude error may in turn be compensated by modifying the usual amount of turns compensation.

---

My invention relates in instrument type potential transformers for supplying to an indicating or recording instrument a low secondary voltage proportional in magnitude and phase to an applied primary voltage to be measured while insulating the instrument from the primary potential. More particularly, the invention relates to means for improving the accuracy of such a transformer when utilized in combination with a load circuit which draws a large volt-ampere burden at high power factor.

It is well known that the exciting current of any transformer, or the vectorial sum of exciting current and load current, in traversing the impedances of the primary and secondary windings produces voltage drops which result in magnitude (i.e., ratio) and phase angle errors between the applied primary voltage and the secondary voltage reversed. The error in magnitude is called ratio error and is usually expressed as the factor by which the marked (i.e., desired) voltage ratio must be multiplied to obtain the true operating ratio (under any predetermined load condition). This factor is called Ratio Correction Factor RCF. Thus:

$$RCF = \frac{\text{True Voltage Ratio}}{\text{Marked Voltage Ratio}}$$

The error, or deviation, in phase angle is of no significance if only voltage magnitude is to be measured. However if the output voltage of the potential transformer is to be supplied to a wattmeter, the phase angle error must be taken into account. The angle error is generally referred to as $\gamma$ (gamma) and is the angle between the primary voltage and the secondary voltage reversed. It is regarded as positive when the reversed secondary voltage leads the primary voltage.

It is common to express the foregoing magnitude and phase angle errors in a single number called Transformer Correction Factor, or TCF. The TCF is that number by which a wattmeter reading must be multiplied to correct for the combined effect of RCF and $\gamma$, and it thus represents the product of RCF and a function of $\gamma$. In practice, however, TCF is closely approximated by the sum of RCF and a fractional part of $\gamma$ as:

$$TCF = \frac{\gamma}{2600} + RCF$$

A graphical representation of constant TCF in terms of RCF and $\gamma$ is thus a straight line having negative slope as $\gamma$ and RCF vary. By defining upper and lower limits of TCF, the graphical result is a pair of parallel lines of equal slope forming a parallelogram known as the Accuracy Parallelogram. By this means potential transformers are classified in respect to limits of accuracy.

A transformer designed to maintain accuracy within predetermined limits of TCF typically has a small no-load phase angle error ($\gamma$) and RCF near unity (i.e., magnitude error=0) within an Accuracy Parallelogram of predetermined limits. Accuracy, of course, depends upon the volt-ampere magnitude and power factor of the burden. In practice, standard burdens have been specified, and transformers are designed to accommodate one or more such burdens within predetermined limits of voltage accuracy defined by a selected Accuracy Parallelogram. This is sometimes difficult to accomplish in design because positive phase angle errors are not commonly encountered with the standard burdens. Accordingly, one-half of the acceptable error range is usually unavailable for use in transformer design. It is especially difficult to maintain voltage error within low limits at high volt-ampere burdens and with burdens having power factor near unity.

Accordingly, therefore, it is a general object of my invention to improve the accuracy of instrument type potential transformers under conditions of high volt-ampere load or high power factor load, or both.

It is a more particular object of my invention to provide compensating means for so adjusting the load and no-load errors in phase angle and magnitude of output voltage in potential transformers that high volt-ampere and high power factor loads may be accommodated while maintaining a high degree of voltage accuracy.

In carrying out my invention in one preferred embodiment, I utilize a single-stage or multi-stage potential transformer of the instrument type having a low reluctance iron core and characterized by low magnetizing current, high internal inductance and low magnetic leakage. Such a transformer typically has no-load phase angle and ratio errors near zero (i.e., $\gamma=0$; RCF=1 on an Accuracy Parallelogram). A unity power factor external burden on the secondary winding typically increases the phase angle error $\gamma$ in the negative direction while increasing the ratio error to a lesser degree, RCF being above unity. As the load magnitude in volt-amperes increases, these errors soon exceed the desired limits of TCF when high accuracy is desired, so that the transformer is limited to use with small external burdens. To overcome this limitation I provide across the secondary winding output terminals, and preferably as an integral internal part of the transformer structure, a predetermined fixed inductive impedance independent of the external burden supplied from the secondary terminals. The effect of such a fixed compensating impedance is to permit use of the transformer with external burdens of greater volt-ampere rating without exceeding predetermined limits of accuracy as measured by TCF and the applicable Accuracy Parallelogram.

The fixed reactive impedance characteristic of my invention may be inductive or capacitive, as load conditions may require. Such compensating impedance affects both phase angle error and magnitude error, and the magnitude effect may itself be overcome, if desired, by modifying the amount of turns compensation otherwise appropriate. By utilizing an abnormal amount of turns compensation in combination with inductive compensation, it is possible to utilize otherwise unavailable portions of the Accuracy Parallelogram in the positive $\gamma$ range.

My invention will be more fully understood and its several objects and advantages further appreciated by referring now to the following detailed specification taken in conjunction with the accompanying drawing wherein.

Figure 1:
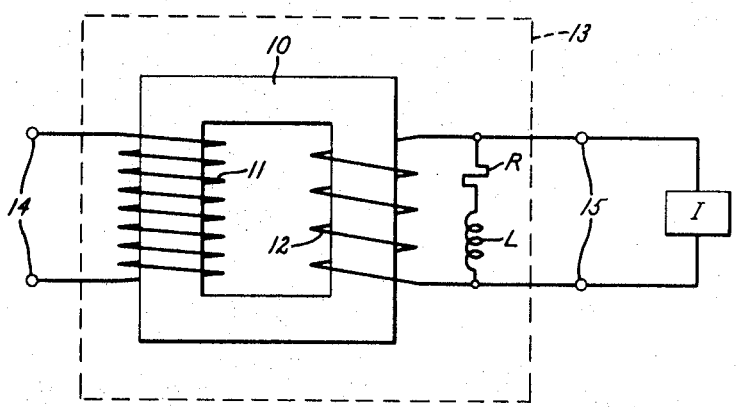
FIG. 1 is a schematic circuit diagram of an instrument type potential transformer embodying my invention.

FIG. 5 is a graphical representation of typical Accuracy Parallelograms defining limits of secondary voltage accuracy in a transformer of the type illustrated at FIG. 1; and FIGS. 6 and 7 are each diagrammatic representations of a single Accuracy Parallelogram upon which are superposed typical accuracy characteristics of a potential transformer under selected load conditions to illustrate the effect of error compensation in accordance with my invention.

Referring now to FIG. 1, I have illustrated a potential type instrument transformer comprising a closed magnetizable core 10 of low reluctance. The core 10 is preferably formed of steel laminations having such loop or rectangular configuration that substantially the entire magnetic flux lies within the core. Upon opposite legs of the core 10, I provide a primary winding 11 and a secondary winding 12. The closed core 10 has very little magnetic leakage or stray flux, so that substantially all flux passing through the primary winding passes also through the second winding. For clarity of illustration, windings 11 and 12 are shown wound upon opposite legs of a rectangular core, but it will be understood by those skilled in the art that, if desired, the primary and secondary windings may be superposed one upon the other upon a single core leg so that stray flux loss between the windings is further reduced.

The transformer comprising the core 10 and windings 11 and 12 is preferably disposed within a housing 13 indicated schematically by dotted lines. The primary winding 11 is provided with input terminals 14, and the secondary winding 12 is provided with output terminals 15. Between the secondary winding output terminals 15 there is provided in shunt circuit relation with the secondary winding 12 a primarily reactive compensating impedance. At FIG. 1 such compensating impedance is shown as an inductance L having relatively small resistance R in series circuit relation therewith. The compensating impedance R, L is preferably positioned within the transformer housing 13 and fixedly connected between the output terminals 15. It is thus permanently in parallel circuit relation with any external load connected across the terminals 15. Such an external load is indicated schematically at I. The load I may, for example, be a suitable voltage indicating instrument or the voltage measuring coils of a wattmeter.

Figure 2:
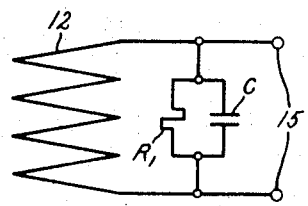
FIG. 2 is a partial schematic circuit diagram of the transformer shown at FIG. 1 modified to illustrate another embodiment of my invention.

At FIG. 2 I have illustrated another embodiment of my invention wherein the reactive compensating impedance fixedly connected across the output terminals 15 of secondary winding 12 is capacitive. The capacitor C, shown so connected, inherently possesses certain losses indicated by a resistor $R_1$ in parallel circuit relation with the capacitor. In some cases, of course, a separate resistor $R_1$ may be used to provide the desired total impedance.

While a potential transformer serves one useful purpose in electrically insulating the secondary circuit and output terminals 15 from the potential of the primary circuit, such a transformer usually performs also a second function in producing at the secondary terminals a low signal voltage proportional in phase and magnitude to a higher primary voltage and suitable for use in an indicating instrument. The primary voltage at input terminals 14 is thus usually higher than the secondary voltage and in some instances may be several thousand or hundreds of thousands of volts while the secondary or output voltage is of the order of 100 volts. The theoretical voltage ratio between the primary and secondary windings of a transformer having substantially zero leakage flux is equal to the turns ratio $N1/N2$, where N1 is the number of turns in the primary winding and N2 is the number of turns in the secondary winding.

In an instrument potential transformer having a core designed to minimize exciting current, the error, or deviation, in voltage caused by the exciting current may be very small. In addition, however, the load component of current flowing as a result of connected burden produces voltage drops in the windings equal to the product of winding resistance and load current and a quadrature drop equal to the product of winding leakage reactance and load current. It is well known to those skilled in the art that such internal voltage drops result in output voltage error both in ratio and in phase angle. The ratio component of such error may be compensated by so modifying the ratio of primary to secondary winding turns that the actual ratio is slightly lower than the desired marked ratio in an amount sufficient to compensate for inductive current flow.

However, in an instrument potential transformer where power metering accuracy is required, it is necessary to take into account the phase angle errors. My invention has the effect of compensating both ratio and phase angle errors due to both exciting and burden components of winding currents in such a way that the transformer is rendered more accurate over a wider range of load currents and burden power factors in selected cases. To describe its effect, it is desirable first to review briefly the nature of the voltage errors characteristically present in a potential transformer as a result of current flow.

Figure 3:
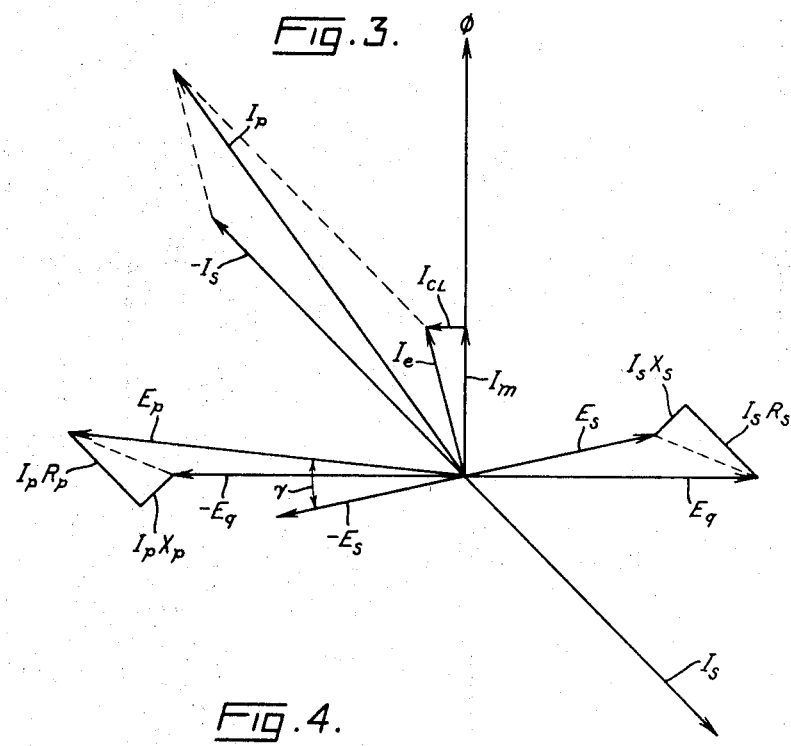
FIG. 3 is a diagrammatic vectorial representation of typical current and voltage vectors representing the characteristic relationship of such quantities in a potential transformer.

At FIG. 3, I have shown a vector diagram of primary and secondary voltage and current relations in a typical potential transformer having an ideal, or nominal, primary-to-secondary voltage ratio of unity. The manner in which voltage ratio error and voltage phase angle error arises as a result of current flow in the transformer will become evident from this diagram.

In the diagram at FIG. 3 the mutual core flux (common to both primary and secondary) is shown as a vector $\phi$ extending upward at 90 degrees to the base line. The exciting current $I_e$ leads the flux vector by an acute angle, and, as is well known, comprises a magnetizing component $I_m$ and a core loss component $I_{cl}$. The voltage induced in the secondary winding by the mutual flux $\phi$ is represented by the vector $E_q$ and the component of primary voltage required to overcome the induced voltage is shown as $-E_q$. The secondary current due to the burden is represented by $I_s$. The total primary current $I_p$ consists of the vector addition of exciting current $I_e$ and reversed secondary current $-I_s$. When $I_s$ is zero, the only current that flows is $I_e$ which produces an impedance drop in the primary winding and causes the reversed secondary voltage $-E_q$ (which under no load is equal to $E_s$) to differ slightly in magnitude and phase from the applied primary voltage $E_p$. This no load condition, while not shown on the diagram, is well understood by those skilled in the art.

In order better to illustrate the source of voltage magnitude and phase angle errors, however, there is shown at FIG. 3 a secondary current $I_s$ lagging the secondary voltage and representing an inductive burden. This secondary current $I_s$ together with the exciting current $I_e$ produce a primary current $I_p$. From an examination of FIG. 3, it will now be evidence to those skilled in the art that as a result of the impedance drop in the secondary winding due to the flow of the load current $I_s$, the actual secondary voltage $E_s$ differs from the secondary induced voltage $E_q$ by a vectorial quantity representing voltage drop in the secondary winding. At FIG. 3 this quantity is the sum of the resistive and reactive voltage drops in the secondary winding, shown respectively as $I_sR_s$ and $I_sX_s$. Similarly the primary winding input voltage $E_p$ differs from the reversed induced secondary voltage $-E_q$ by the voltage drop components $I_pR_p$ and $I_pX_p$, the vectorial sum of which represent impedence drop in the primary winding. It will thus be evident that the actual secondary voltage $E_s$, shown reversed as $-E_s$, differs from the primary voltage $E_p$ both in magnitude and phase as a result of current flow.

The voltage magnitude error is usually expressed as a number, or factor, by which the rated, or marked, voltage ratio must be multiplied to obtain the true, or actual, voltage ratio under a particular load condition.

The phase angle error is shown as an angle $\gamma$ between the primary voltage and the secondary voltage reversed, this error being considered positive when the reversed secondary voltage vector leads the primary voltage as shown at FIG. 3. It will be understood by those skilled in the art that FIG. 3 is illustrative of the principles involved and that for simplicity of illustration the angle $\gamma$ has been shown positive. In instrument potential transformers under high power factor load conditions RCF is usually greater than 1, and the angle $\gamma$ is usually negative. These relationships, however, depend upon the character of the load impedance, and under some conditions it is possible that the phase angle error $\gamma$ will be positive or the RCF less than 1, or both.

Figure 4:
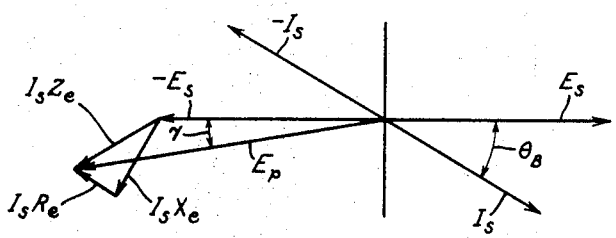
FIG. 4 is a simplified partial vector diagram similar to that of FIG. 3 illustrating particularly the relationship between primary and secondary voltages.

At FIG. 4 I have illustrated a similar vector diagram wherein exciting current is neglected and equivalent values of primary and secondary winding impedance are represented by $R_e$, $X_e$ and $Z_e$. The resultant equivalent impedance drop through the transformer is represented by the vector $I_sZ_e$ and is so proportioned vectorially that the angle $\gamma$ is negative. The vectorial difference betwen $I_sZ_e$ and the primary voltage $E_p$ represents $-E_s$, and thus FIG. 4 illustrates the voltage magnitude and phase angle errors in a manner similar to FIG. 3 but for errors due only to burden.

It will now be evident to those skilled in the art that the voltage magnitude and phase angle errors in a typical potential transformer having low magnetizing current are small at no load and increase as load current increases. As is also well understood, the phase angle error, while slightly positive at no-load, usually decreases to zero and becomes negative as load increases unless the load is highly inductive. Moreover, if the load, i.e., burden, is primarily resistive (i.e., power factor of burden is substantially unity) the phase angle error increases negatively as load increases, while the voltage ratio error increases at a much lesser rate. By way of comparison it may also be noted that with highly reactive loads the ratio error changes much more significantly as load increases than does the phase angle error. These effects are well-known to those silled in the art and will become more evident by referring now to the Acuracy Parallelograms described below.

At FIG. 5 I have shown three Accuracy Parallelograms representing three degrees or classes of accuracy as established by the American Standards Association. Referring for example to the outer diagram, the upper and lower limits of Ratio Correction Factor RCF are established arbitrarily as 1.012 and .988, and accordingly this outer parallelogram is referred to as a 1.2 accuracy class diagram. The lateral limits of negative slope are establishel in the determination of upper and lower limiting values of the combined quantity TCF, i.e., Transformer Correction Factor, where $$TCF = \frac{\gamma}{2600} + RCF$$

The significance of this diagram is that any point within its confines represents an acceptable value of TCF and its components RCF and $\gamma$. The smaller included parallelograms similarly represent 0.6 and 0.3 accuracy classes, respectively, wherein the limits of accuracy are smaller.

At FIG. 6 I have shown a single Accuracy Parallelogram generally identified as P in combination with a graphical representation of certain transformer error characteristics which illustrate the mode of operation of my invention.

At FIG. 6 I have illustrated a point 20 representing the no-load values of RCF and $\gamma$ for a typical low reluctance potential transformer of the type shown at FIG. 1 with the compensating impedance R, L omitted. As previously pointed out, the voltage ratio and phase angle errors in such a transformer typically increase along a line of negative slope as the volt-ampere burden supplied to a partially inductive load is increased. At FIG. 6 the line 20–21 represents the locus of such ratio and phase angle errors for a .85 power factor burden, the point 21 representing, for example, a burden of 400 voltamperes at a 120 secondary volts. This is the highest burden specified in the standards of the American Standards Association. It will be observed that at this full-load value, the point 21 represents a Ratio Correction Factor beyond the acceptable limits defined by the parallelogram P. Similarly, a line 20–22 represents the locus of TCF as burden increases where the load I of FIG. 1 is primarily resistive so that the power factor of the burden approaches unity. In this case, also, the 400 volt-ampere about 22 is beyond the acceptable limits defined by the parallelogram P.

As previously described, my invention comprises error compensation of such a transformer by reactive impedance so arranged that errors at high volt-ampere values of burden and at relatively high power factors of inductive load will remain within the limits of the Accuracy Parallelogram P. For this purpose, I fixedly connect across at least a portion of the secondary winding 12, and preferably directly between the output terminals 15, a predetermined fixed compensating impedance of predominantly reactive character. For example, the compensating impedance R, L shown in FIG. 1, being predominantly inductive, has the effect of shifting the no-load error point from the point 20 to a point 30 at FIG. 6. It will now be observed that a heavy external burden, for example 400 volt-amperes at unity power factor may be applied across the output terminals 15 without exceeding acceptable limits of error if the power factor of the burden is substantially unity. In this case, the line 30, 32 represents the locus of TCF values as the load current of such a burden is increased from 0 to 400 volt-amperes. It is evident of course that such compensation is not alone sufficient to accommodate within the acceptable limits of error a .85 power factor burden such as represented by the line 20, 21.

To accommodate either a unity power factor burden or a highly inductive burden of high volt-ampere rating, the inductive compensation shown at FIG. 1 may be combined with appropriate winding turns compensation in such a way that the no-load ratio and phase angle errors are represented by the point 40 at FIG. 6. In such compensation the dotted line 20, 40' represents a shift in the no-load error due solely to compensation by varying the turns ratio of the windings from its theoretical value in such a sense that the actual voltage ratio at no-load is less than that desired (i.e., RCF less than 1). As indicated at FIG. 6, such turns compensation, when combined with inductive compensation in the manner illustrated by the internal impedance R, L at FIG. 1, may be so great that the turns compensation alone would result in no-load error beyond the limits of the parallelogram, as at point 40'. When such abnormally large turns compensation is combined, however, with an inductive compensating impedance shown at FIG. 1, the actual no-load error point is shifted along the line 40', 40 to an actual no-load error point 40. It will now be evident to those skilled in the art that a unity power factor burden of 400 volt-amperes will shift the ratio and phase angle errors along a locus line 40, 42 to a point 42 well within the acceptable limits defined by the parallelogram P. Similarly a .85 power factor inductive burden will shift the TCF and its component ratio and phase angle errors to a point 41 also well within the Accuracy Parallelogram P.

It will now be observed from FIG. 6 that by utilizing inductive compensation alone without turns compensation (as by shifting no-load error to the point 30), a high volt-ampere burden at unity power factor is accommodated, but that unacceptable error values at lower inductive power factors as represented by the point 21 are not eliminated. The capacitive internal compensating impedance shown at FIG. 2 has the effect of rendering the transformer sufficiently accurate for external inductive burdens of high power factor without improving its accuracy for unity power factor burdens. This effect is illustrated at FIG. 6 by a dotted line 20–50 which represents the shift in no-load errors resulting from use of capacitive compensation $R_1C$ as shown at FIG. 2. It will now be evident that, starting from the point 50 at no load, a .85 power inductive burden connected externally to the output terminals 15 increases the ratio and phase angle errors along a line 50, 51 to a point 51 for a high 400 volt-ampere load, the point 51 being well within the acceptable limits of error as defined by the parallelogram P.

To further illustrate useful applications of my invention I have shown at FIG. 7 an Accuracy Parallelogram having superposed thereon the error characteristics of a high flux density transformer having a low power factor burden. The uncompensated locus of error is along a line 23–24. By capacitive compensation the no-load error may be shifted to the point 60 so that the locus of error lies along the line 60–61 entirely within the parallelogram.

It will now be apparent to those skilled in the art that a typical low reluctance potential transformer of the instrument type may be compensated for voltage errors resulting from external burdens of high volt-ampere rating, and especially for high burdens of resistive or inductive character, by connecting across a secondary or other winding a fixed reactive compensating impedance selected to shift no-load and full-load voltage errors in an appropriate direction and by an appropriate amount. Such reactive compensation alone affects both phase angle error and ratio error. When a desired reactive compensation of phase angle error also produces undesired change in ratio error such change may be counteracted by additional turns compensation beyond that otherwise required. More particularly, inductive compensation may be combined with abnormally large turns ratio compensation to bring the accuracy characteristics of a transformer within acceptable limits for high external burdens having either unity power factor or a high inductive power factor.

While I have shown and described certain preferred embodiments of my invention by way of illustration, other modifications will occur to those skilled in the art. For example, the secondary winding referred to above and in the appended claims need not be the transformer output winding; it may be a separate winding or an included or extended portion of the primary winding or the output winding. I therefore wish to have it understood that I intend herein to cover all such modifications as fall within the true spirit and scope of my invention.

What I claim as new and desire to secure by Letters Patent of the United States is:

1. In an instrument potential transformer adapted to supply current to a large volt-ampere burden under high inductive power factor conditions without exceeding preselected low limits of secondary-to-primary error in voltage ratio and phase angle, a low reluctance magnitizable core, primary and secondary windings mounted on said core to provide low magnetic leakage therebetween, and a capacitor fixedly connected directly across at least a portion of said secondary winding for reducing one said error under high burden conditions without adversely affecting the other said error.

2. In an instrument potential transformer adapted to supply current to a large volt-ampere burden at a high power factor near unity without exceeding preselected low limits of secondary-to-primary error in voltage ratio and phase angle,
a low reluctance magnetizable core,
primary and secondary windings mounted on said core to provide low magnetic leakage therebetween,
and means including an inductive impedance fixedly connected across at least a portion of said secondary winding for reducing one said error under high burden conditions without adversely affecting the order.

3. An instrument potential transformer according to claim 2 wherein the ratio of turns in said primary and secondary windings is more than sufficient to counteract the voltage ratio error introduced by said inductive impedance whereby both said voltage ratio and phase angle errors under full load conditions are diminished.

4. An instrument potential transformer adapted to supply current to resistive or inductive loads having high power factor and high volt-ampere rating without exceeding preselected low limits of secondary-to-primary error in voltage ratio and phase angle,
a low reluctance magnetizable core,
primary and secondary windings mounted on said core to provide low magnetic leakage therebetween, said secondary winding having a pair of output terminals,
the actual ratio of turns between said windings differing from the desired ratio of primary and secondary voltages under load conditions in a sense to increase the voltage ratio error at no load beyond said preselected limit,
and compensating means for partially counteracting said no-load voltage ratio error and reducing said phase angle error under load conditions comprising an inductive impedance fixedly connected between said output terminals.

5. In an instrument potential transformer according to claim 4 adapted to operate under load within limits of voltage ratio and phase angle error defined by a parallelogram having preselected upper and lower limits of ratio error above and below unity and lateral limits defined by two preselected constants representing maximum and minimum limiting sums of predetermined functions of said errors,
primary and secondary windings having a turns ratio differing from the desired transformer voltage ratio to a degree sufficient to locate voltage ratio error beyond said lower limit at no load with said secondary winding open circuited,
said inductive impedance increasing said phase angle error and decreasing said voltage ratio error at no-load and operating to maintain both said errors within said limiting parallelogram over a wide range of load current.

References Cited

UNITED STATES PATENTS

| | | | |
|---|---|---|---|
| 1,994,279 | 3/1935 | Higgins | 323—61 X |
| 2,600,204 | 6/1952 | Carleton. | |
| 2,668,274 | 2/1954 | Schneider | 323—61 |
| 3,040,240 | 6/1962 | Gotal et al. | 323—50 |

J D MILLER, Primary Examiner

G. GOLDBERG, Assistant Examiner

U.S. Cl. X.R.

323—109, 110; 324—74